United States Patent
Farber et al.

(10) Patent No.: US 7,452,408 B2
(45) Date of Patent: Nov. 18, 2008

(54) SYSTEM AND METHOD FOR PRODUCING BUBBLE FREE LIQUIDS FOR NANOMETER SCALE SEMICONDUCTOR PROCESSING

(75) Inventors: Jeffrey J. Farber, Delmar, NY (US); Carl Woods, Aptos, CA (US)

(73) Assignee: Lam Research Corporation, Fremont, CA (US)

(*) Notice: Subject to any disclaimer, the term of this patent is extended or adjusted under 35 U.S.C. 154(b) by 643 days.

(21) Appl. No.: 11/173,132

(22) Filed: Jun. 30, 2005

(65) Prior Publication Data

US 2007/0000387 A1   Jan. 4, 2007

(51) Int. Cl.
*B01D 19/00* (2006.01)
(52) U.S. Cl. .................. 95/260; 95/241; 96/205; 96/155; 96/206
(58) Field of Classification Search ............ 95/260, 95/241; 96/204–218, 155
See application file for complete search history.

(56) References Cited

U.S. PATENT DOCUMENTS

| | | | | |
|---|---|---|---|---|
| 1,734,507 A * | 11/1929 | Westling et al. | ............ | 96/208 |
| 2,816,490 A * | 12/1957 | Boadway et al. | ............ | 96/195 |
| 3,345,803 A * | 10/1967 | Smith | ............ | 95/260 |
| 4,756,724 A * | 7/1988 | Yuill | ............ | 96/158 |
| 5,507,858 A * | 4/1996 | Jepson | ............ | 95/262 |
| 6,752,860 B1* | 6/2004 | Hoydal et al. | ............ | 96/157 |
| 2003/0221561 A1* | 12/2003 | Milo | ............ | 96/175 |
| 2006/0137974 A1* | 6/2006 | Du et al. | ............ | 204/232 |

OTHER PUBLICATIONS

PCT International Search Report—PCT US06/23134 (4 pages) Dated Jun. 10, 2008.

* cited by examiner

*Primary Examiner*—Duane Smith
*Assistant Examiner*—Douglas J Theisen
(74) *Attorney, Agent, or Firm*—Martine Penilla & Gencarella, LLP

(57) ABSTRACT

A system for producing bubble free liquid includes a continuous liquid source and a de-bubbling chamber. The de-bubbling chamber includes an outlet and an inlet. The inlet coupled to an outlet of the continuous liquid source by a supply pipe. The de-bubbling chamber also includes at least one port in a sidewall of the de-bubbling chamber. The at least one port being at least a length L from the inlet of the de-bubbling chamber. A method for producing bubble free liquid is also described.

23 Claims, 8 Drawing Sheets

SYSTEM AND METHOD FOR PRODUCING BUBBLE FREE LIQUIDS FOR NANOMETER SCALE SEMICONDUCTOR PROCESSING

BACKGROUND

The present invention relates generally to fluid handling, and more particularly, to methods and systems for removing bubbles from fluids.

Semiconductor manufacturing processes includes many processes where the semiconductor is immersed in a liquid. By way of example, a liquid etching process, a cleaning process, a rinsing process, a photolithographic process, or an electroplating process. The size of the features and devices are continually getting ever smaller. If the bubbles that occur in the liquid are larger than the features and devices being processed by the liquid, then the bubbles can adversely impact the performance of the liquid process. By way of example, if a bubble has a 10 micron diameter and is formed on a surface of the semiconductor and the semiconductor has 0.25 micron or smaller devices and features formed thereon, then the bubble may encompass several 0.25 micron or smaller devices and features. The bubble may prevent the process from being applied to the devices and features that are encompassed by the bubble.

In view of the foregoing, there is a need for a system and method of applying a substantially bubble free liquid for semiconductor processing.

SUMMARY

Broadly speaking, the present invention fills these needs by providing a system and a method for producing substantially bubble free liquid. It should be appreciated that the present invention can be implemented in numerous ways, including as a process, an apparatus, a system, computer readable media, or a device. Several inventive embodiments of the present invention are described below.

A system for producing bubble free liquid includes a continuous liquid source and a de-bubbling chamber. The de-bubbling chamber includes an outlet and an inlet. The inlet coupled to an outlet of the continuous liquid source by a supply pipe. The de-bubbling chamber also includes at least one port in a sidewall of the de-bubbling chamber. The at least one port being at least a length L from the inlet of the de-bubbling chamber.

The continuous liquid source can include a heater for heating the liquid to a temperature less than about boiling point of the liquid. The at least one port can be coupled to a cooler. The continuous liquid source can include a holding tank. The continuous liquid source can include a liquid supply coupled to the holding tank.

The continuous liquid source can include a continuous-type pump. The continuous-type pump can consist of at least one of a centrifugal or a Levitronix pump.

The wetted materials can include at least one of a PTFE, PVDF, Ertalyte (PET), or stainless steel. The length L can be equal to at least 10 diameters of the de-bubbling chamber. The de-bubbling chamber can have a cross-sectional area substantially equal to a cross-sectional area of the supply pipe.

The de-bubbling chamber can have a cross-sectional area greater than a cross-sectional area of the supply pipe. The de-bubbling chamber can be coupled to the supply pipe by a gradual transition pipe.

The ports can be arranged circumferentially around the de-bubbling chamber. The outlet of the de-bubbling chamber includes a back-pressure device. The outlet of the de-bubbling chamber is coupled to an inlet of the continuous liquid source. The at least one port in a sidewall of the de-bubbling chamber is coupled to at least one of a photolithographic system, a plating system, an electroplating system or a liquid meniscus system.

Another embodiment provides a system for producing bubble free liquid. The system includes a continuous liquid source that includes a heater, a holding tank and a continuous-type pump. The system also includes a de-bubbling chamber including an inlet coupled to an outlet of the continuous liquid source by a supply pipe. The de-bubbling chamber also includes an outlet including a back-pressure device. The outlet is coupled to an inlet of the continuous liquid source. The de-bubbling chamber also includes at least one port in a sidewall of the de-bubbling chamber. The at least one port being at least a length L equal to at least 10 diameters of the de-bubbling chamber from the inlet of the de-bubbling chamber. The at least one port is coupled to a cooler.

Yet another embodiment provides a method of de-bubbling a liquid. The method including providing a continuous flow of liquid through a de-bubbling chamber. The de-bubbling chamber including an outlet and an inlet coupled to an outlet of the continuous liquid source by a supply pipe. The de-bubbling chamber also including at least one port in a sidewall of the de-bubbling chamber. The at least one port being at least a length L from the inlet of the de-bubbling chamber. The method further includes drawing substantially bubble free liquid from the at least one port in the sidewall of the de-bubbling chamber.

The liquid can be heated to a temperature less than about boiling point of the liquid. The liquid has a pressure of between about 5 and about 100 psig in the de-bubbling chamber.

A flow rate through the at least one port is less than about 20% of a total flow into the de-bubbling chamber. Bubbles greater than about 100 nm have been removed from the liquid flowing through the at least one port. The liquid flowing through the at least one port can also be cooled to a desired temperature.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Several exemplary embodiments for providing substantially bubble free liquid such as may be used for semiconductor processing will now be described. It will be apparent to those skilled in the art that the present invention may be practiced without some or all of the specific details set forth herein.

Semiconductor manufacturing applies liquids and liquid films to semiconductor substrates numerous times as part of the manufacturing process. The performance (e.g., effectiveness, speed, etc.) of many of the processes that include the applying liquids and liquid films (i.e., liquid processes) to the semiconductor substrates can be improved if the liquid being used is substantially free of bubbles.

Agitating or aerating the liquid as the liquid is being transported can cause the bubbles in the liquid. The liquid can also include dissolved gases. The dissolved gases can form bubbles in the liquid.

Figure 1:
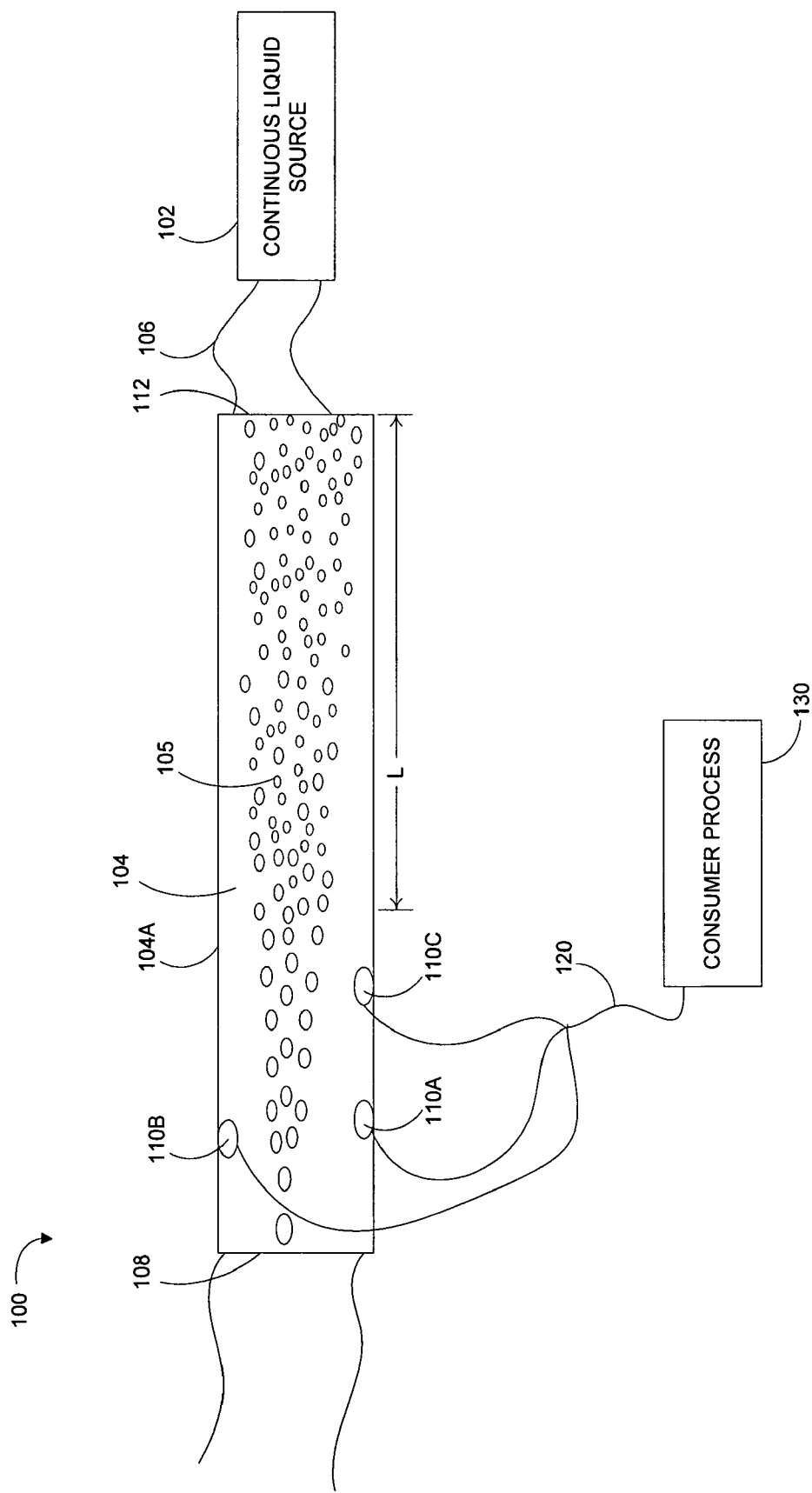
FIG. 1 is a block diagram of a system for providing substantially bubble free liquid, in accordance with one embodiment of the present invention.

FIG. 1 is a block diagram of a system 100 for providing substantially bubble free liquid, in accordance with one embodiment of the present invention. The system includes a liquid source 102 coupled to a de-bubbling chamber 104 by a supply pipe 106. The de-bubbling chamber 104 includes an outlet 108 and one or more ports 110A-110C though the sidewall 104A. The ports 110A-110C are coupled to a tube 120 that supplies the substantially bubble-free liquid to a consumer process 130 that uses the substantially bubble-free liquid. The system 100 substantially removes all bubbles larger than about 100 nm from the liquid. The system 100 can remove bubbles from any type of liquid (e.g., water, DI water, electrolyte, etching chemistries, cleaning chemistries, etc.)

As the liquid flows through the de-bubbling chamber 104 the bubbles 105 tend to form and concentrate in the center portion of the flow. As a result, the liquid flowing along the sidewall 104A tends to include fewer and fewer bubbles. The further the liquid flows through the de-bubbling chamber 104, the more the bubbles 105 are concentrated toward the center of the flow and the less bubbles remain in the liquid flowing along the sidewall 104A. Once the liquid has flowed a distance L from the inlet 112 of the de-bubbling chamber 104, the liquid flowing along the sidewall 104A is substantially bubble free. The ports 110A-110C can be anywhere in the sidewall 104A of the de-bubbling chamber 104 after the distance L from the inlet 112.

The distance L is a function of the flow rate and pressure of the liquid and the ratio of the cross-sectional area of the supply pipe 106 and the cross-sectional area of the de-bubbling chamber 104.

Figure 2:
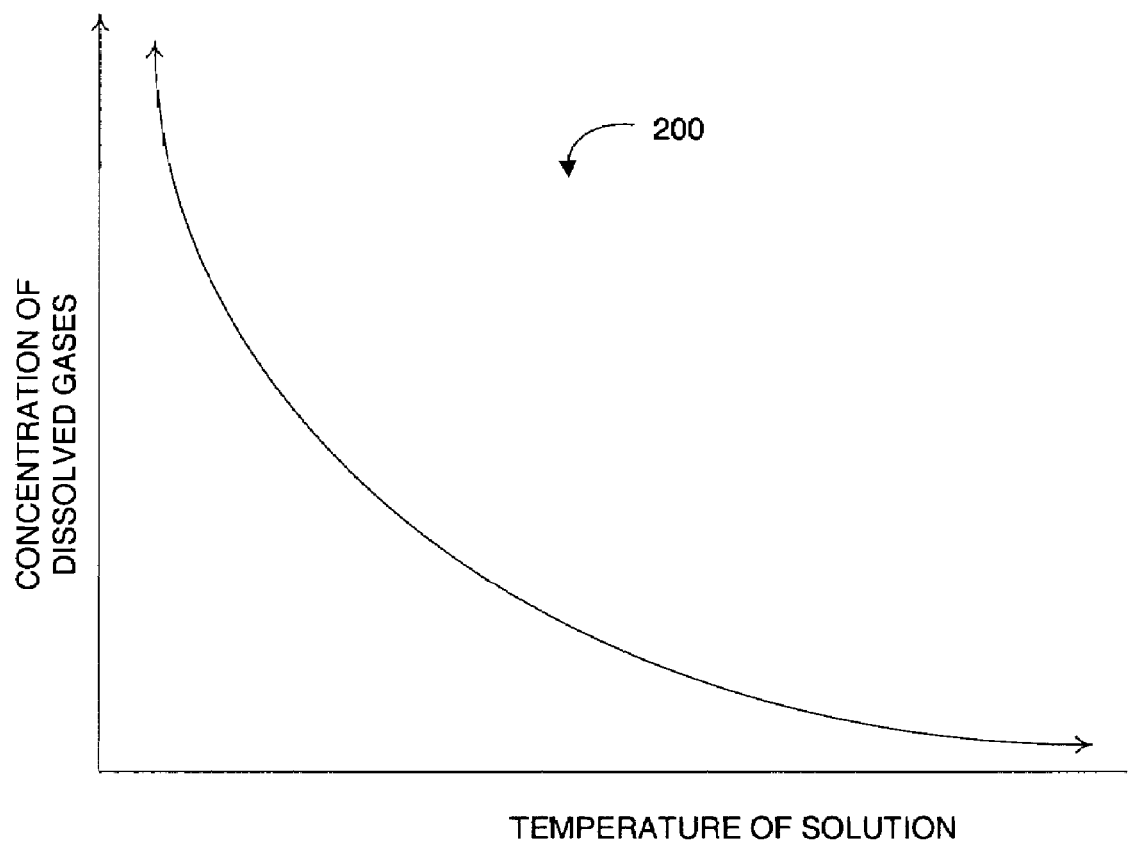
FIG. 2 is a graph of the relationship of dissolved gasses to temperature, in accordance with one embodiment of the present invention.

Heating the liquid can also remove bubbles and dissolved gases. FIG. 2 is a graph 200 of the relationship of dissolved gasses to temperature, in accordance with one embodiment of the present invention. The graph 200 shows a concentration of oxygen and nitrogen in water as compared to the temperature of the water. As shown by the graph 200, as the temperature of the water increases the concentration of oxygen and nitrogen decreases. If the temperature of the water reaches the boiling point for the water, the water begins to form bubbles of steam (water vapor). Therefore, increasing the temperature of the liquid to substantially remove the dissolved gases is limited to some point less than the boiling point of the liquid.

Figure 3:
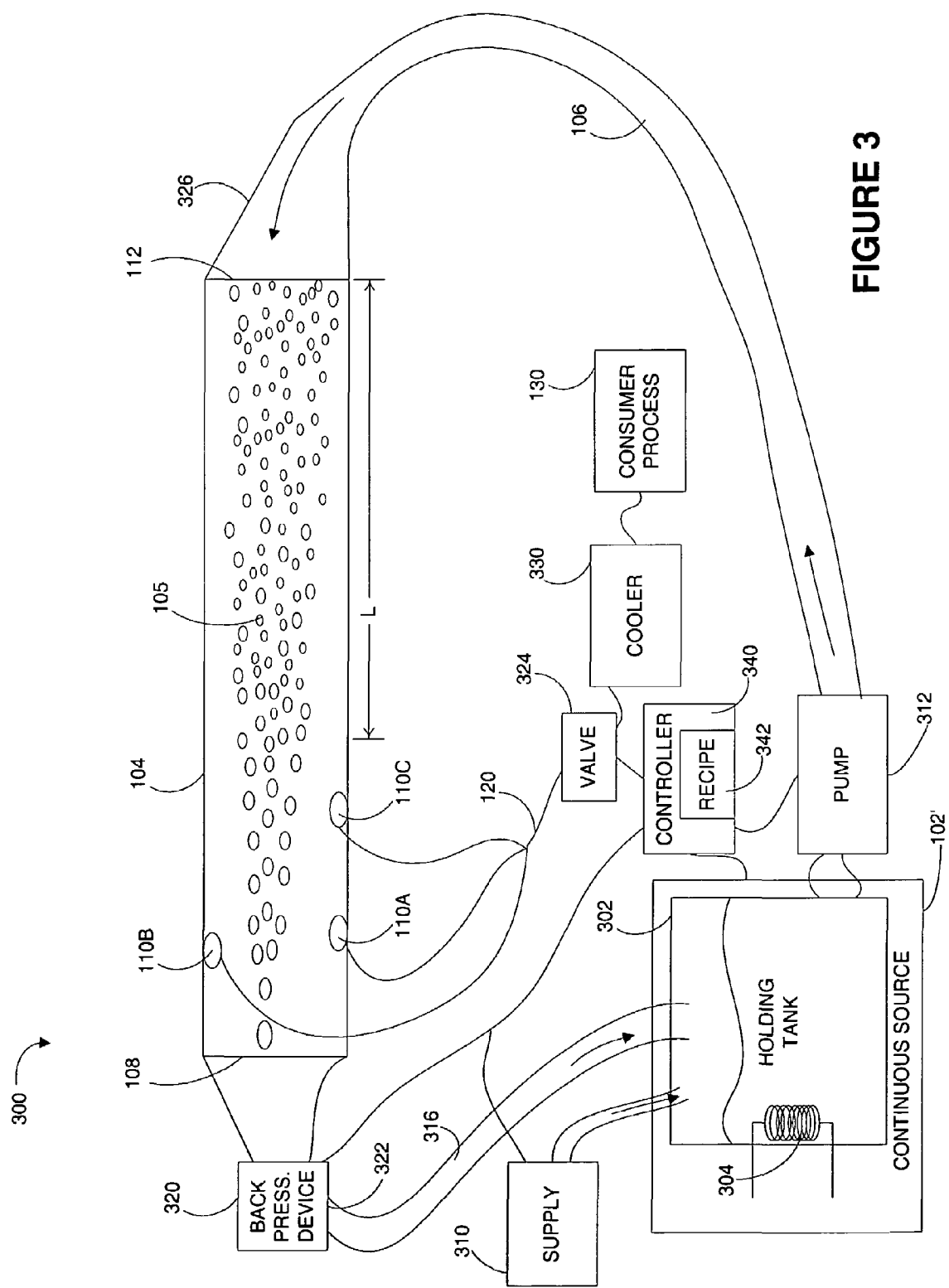
FIG. 3 is a block diagram of a system for providing substantially bubble free liquid, in accordance with one embodiment of the present invention.

FIG. 3 is a block diagram of a system 300 for providing substantially bubble free liquid, in accordance with one embodiment of the present invention. The system 300 includes a continuous source 102' and the de-bubbling chamber 104. The continuous source 102' includes a holding tank 302 and a heat source 304. The heat source 304 can heat the liquid from about 20 degrees C. to about 80% or higher of the liquid's boiling point. By way of example, if the liquid is water, then the heat source 304 can heat the water from about 20 degrees C. to about 120 degrees C. or less than the boiling point of the process liquid at the process conditions.

A liquid supply 310 supplies the liquid to the holding tank 302. The holding tank 302 can have a capacity at least large enough to supply the system 300. By way of example, if the pump 312, supply pipe 106, the de-bubbling chamber 104 and the return pipe 316 have a capacity of about one liter, then the holding tank 302 could have a capacity of about two liters. The holding tank 302 can also have a much greater capacity such as about 10 liters or even more.

A pump 312 includes an inlet coupled to an outlet of the holding tank 302. The pump 312 also includes an outlet coupled to the supply pipe 106. The pump 312 can be a continuous flow-type pump. Continuous flow pumps can include a centrifugal pump such as the Levitronix pump from Levitronix LC, 85 First Wave, Waltham, Mass. 02541.

The supply pipe 106 is coupled to the inlet 112 of the de-bubbling chamber 104. A gradual transition 326 can also be included between the supply pipe 106 and the inlet 112 of the de-bubbling chamber 104. The gradual transition 326 can gradually increase or decrease the cross-section of the liquid flow from the supply pipe 106 to the inlet 112 of the de-bubbling chamber 104. By way of example, if the supply pipe 106 has a smaller cross-section than the inlet 112 of the de-bubbling chamber 104, then the gradual transition 326 can gradually increase the cross-section of the liquid flow. The gradual transition 326, reduces the turbulence in the flow of the liquid. The outlet 108 of the de-bubbling chamber 104 is coupled to a return pipe 316. The return pipe 316 returns whatever liquid flows from the outlet 108 of the de-bubbling chamber 104 to the holding tank 302.

The supply pipe 106 can have a cross-sectional area less than or equal to the cross-sectional area of the de-bubbling chamber 104. By way of example the supply pipe 106 can have a substantially round cross-section and a diameter of about 0.5 inches and the de-bubbling chamber 104 can have a substantially round cross-section and a diameter of about 1.0 inches. The return pipe 316 can have a cross-sectional area less than or equal to the cross-sectional area of the de-bubbling chamber 104. By way of example the return pipe 316 can have a substantially round cross-section and a diameter of about 0.75 inches and the de-bubbling chamber 104 can have a substantially round cross-section and a diameter of about 1.0 inches.

The return pipe 316 and the supply pipe 106 can have substantially the same or different cross-sectional areas. The cross-sectional areas of the de-bubbling chamber 104, the supply pipe 106 and the return pipe 316 can have substantially the same or different cross-sectional shapes. By way of example each of the de-bubbling chamber 104, the supply pipe 106 and the return pipe 316 can have a round, elliptical, rectangular or polygonal cross-sectional shape.

The de-bubbling chamber 104 can include multiple ports 110A-110C. Each of the multiple ports 110A-110C are connected to the tube 120. The tube 120 can include a valve 324.

The ports 110A-110C can have a cross-sectional area of less than about one half the cross-sectional area of the de-bubbling chamber 104. By way of example, if the de-bubbling chamber 104 has a substantially round cross-section and a diameter of about 1.0 inches the ports 110A-110C can have a substantially round cross-sectional area and a diameter of less than about 0.5 inches.

Each of the multiple ports 110A-110C can have a different cross-sectional area. By way of example, a first one of the multiple ports 110A can have a can have a substantially round cross-sectional area and a diameter of less than about 0.5 inches while a second one of the multiple ports 110B can have a can have a substantially round cross-sectional area and a diameter of less than about 0.25 inches. It should be understood that the ports 110A and 110B can have any shape and are not limited to substantially round ports. By way of example, the ports 110A and 110B can have round, square, polygonal, elliptical, tear-drop or other cross-sectional shape.

Each one of the multiple ports 110A-110C can be distributed around the perimeter of the de-bubbling chamber 104. By way of example, a first one of the ports 110A can be located at the "bottom" of the de-bubbling chamber 104 as shown. A second one of the ports 110B can be located at the "top" of the de-bubbling chamber 104 as shown. A third one of the ports 110C can be located closer to the inlet 112 of the de-bubbling chamber 104 than the first port 110A.

The return pipe 316 also includes a backpressure device 320. The backpressure device 320 ensures that there is a pressure differential between a first pressure of the liquid in the de-bubbling chamber 104 and a second pressure of the liquid in at the outlet-side 322 of the backpressure device 320. The backpressure device 320 also ensures a constant pressure and a constant flow rate of the liquid through the de-bubbling chamber 104. The backpressure device 320 can be an actively controlled device such as a flow controller. Alternatively, the backpressure device 320 can be a flow-restricting device such as an orifice. The system 300 can also include a controller 340 that can be coupled to the other components 104, 302, 310, 312, 320, 324 and 330 of the system 300. The controller 340 can also couple the response of the backpressure device 320 and the pump 312. By way of example, the controller 340 can vary the speed (e.g., revolutions per minute) of the pump 312 so as to maintain a desired flow rate through and pressure in the de-bubbling chamber 104. The controller 340 can include a recipe 342 that includes the desired operating parameters for the system 300. The pressure in of the liquid in the de-bubbling chamber 104 is within a range of about 0.5 psig to about 100 psig.

The system 300 can also include a cooler 330 for cooling the substantially bubble free liquid. The cooler 330 can cool the liquid in the tube 120 to the desired working temperature.

The system 300 can be fully closed and the pressure maintained at any desired pressure. By way of example, the holding tank can include a low pressure (e.g., between 0 and 760 torr) so as to enhance the out gassing of any gases dissolved in the liquid.

The system 300 can also include multiple de-bubbling chambers 104. By way of example, a single supply pipe 106 can connect to the inlet of multiple de-bubbling chambers. Similarly, the return pipe 316 can be coupled to the outlet of multiple de-bubbling chambers.

The system 300 can be a point of use providing substantially bubble free liquid to a single consumer process 130. The system 300 can also provide substantially bubble free liquid to multiple consumer processes 130.

The components 104, 106, 120, 302, 312, 316, 320 and 330 of the system 300 can be constructed of any suitable material. By way of example, if the liquid is water, the components 104, 106, 120, 302, 312, 316, 320 and 330 can be constructed of polyvinylidene difluoride (PVDF), polytetrafluoroethylene (PTFE materials such as Teflon from DuPont), Ertalyte (PET), stainless steel and other materials and combinations thereof.

Figure 4:
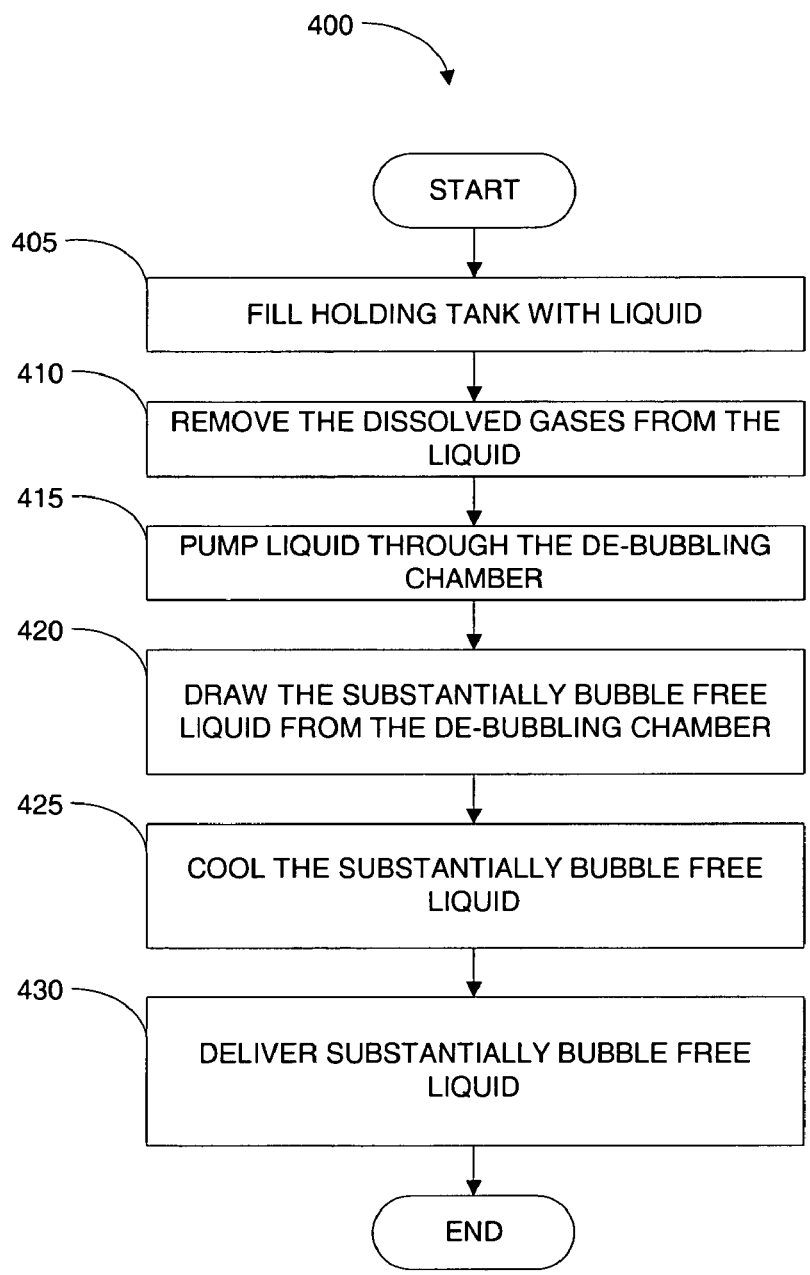
FIG. 4 is a flowchart diagram that illustrates the method operations performed in providing substantially bubble free liquid, in accordance with one embodiment of the present invention.

FIG. 4 is a flowchart diagram that illustrates the method operations 400 performed in providing substantially bubble free liquid, in accordance with one embodiment of the present invention. In an operation 405, the holding tank 302 is filled with liquid. The liquid can optionally be temporarily stored in the holding tank 302 so as to allow many of the larger bubbles in the liquid to be released.

In an optional operation 410, the heat source can heat the liquid to a temperature sufficient to substantially remove any gases dissolved in the liquid. By way of example, the heat source can heat the liquid between any temperatures within the range of the initial temperature of the liquid (i.e., no heating) to less than the boiling temperature of the liquid.

In an operation 415, the pump 313 pumps the liquid from the holding tank 302 into the supply pipe 106, the de-bubbling chamber 104 and the return pipe 316. The liquid may be allowed to flow through the pump 313, the supply pipe 106, the de-bubbling chamber 104 and the return pipe 316 for a desired period to allow for conditions in the de-bubbling chamber 104 to stabilize. By way of example the liquid may be allowed to flow through the pump 313, the supply pipe 106, the de-bubbling chamber 104 and the return pipe 316 for between about 30 seconds and about 5 minutes.

In an operation 420, the substantially bubble-free liquid can be drawn from the de-bubbling chamber 104 through the ports 10A-110C to the pipe 120. By way of example, the valve 324 can be opened to draw the substantially bubble-free liquid from the de-bubbling chamber 104 through the ports 110A-10C. The flow rate of the substantially bubble-free liquid is less than about 20% of a total flow into the de-bubbling chamber 104.

In an optional operation 425, the substantially bubble-free liquid can be cooled. By way of example the substantially bubble-free liquid can flow through the cooler 330 to cool to a desired temperature.

In an operation 430, the substantially bubble-free liquid is delivered to one or more consumer processes and the method operations can end. By way of example, the substantially bubble-free liquid can be delivered to an electroplating process or a photolithographic process such as an immersion photolithographic process. The substantially bubble-free liquid can be delivered continuously or can be delivered intermittently (i.e., on demand) to the consumer process.

Figure 5:
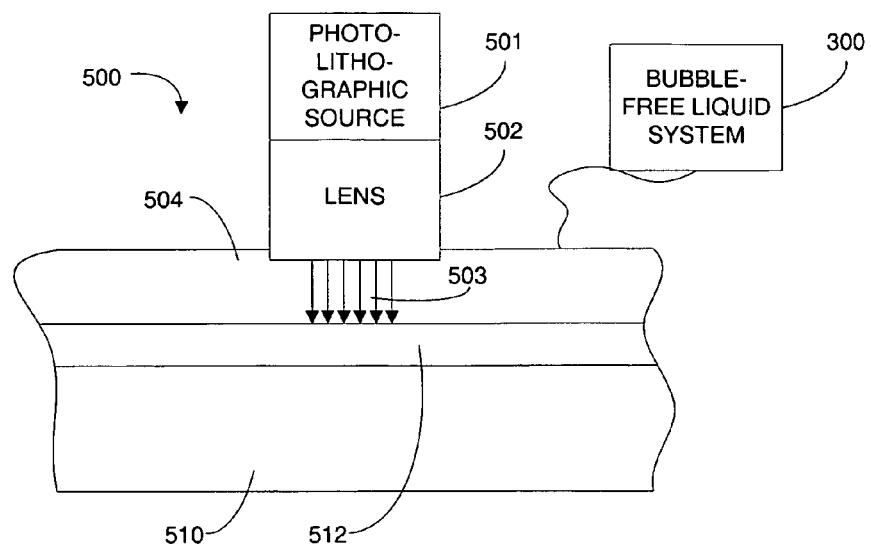
FIG. 5 is a block diagram of an immersion photolithographic system using substantially bubble free liquid, in accordance with one embodiment of the present invention.

FIG. 5 is a block diagram of an immersion photolithographic system 500 using substantially bubble free liquid, in accordance with one embodiment of the present invention. The system 500 includes the substantially bubble free liquid system 300 as described in FIGS. 3 and 4 above. The system 500 also includes a photolithographic source 501 and a lens 502. The photolithographic source 501 is well known in the art. The lens 502 is immersed in a layer of substantially bubble-free liquid 504. Light or energy 503 is emitted from the lens 502. Immersing the lens 502 in the layer of substantially bubble-free liquid 504 ensures that the index of Diffraction of the liquid is the only diffraction that impacts the light 503. As the liquid 504 is substantially free of bubbles, no bubbles will interfere with the light 503. As a result, more of the light 503 will contact the layer 512 on the substrate that is being processed.

Figure 6:
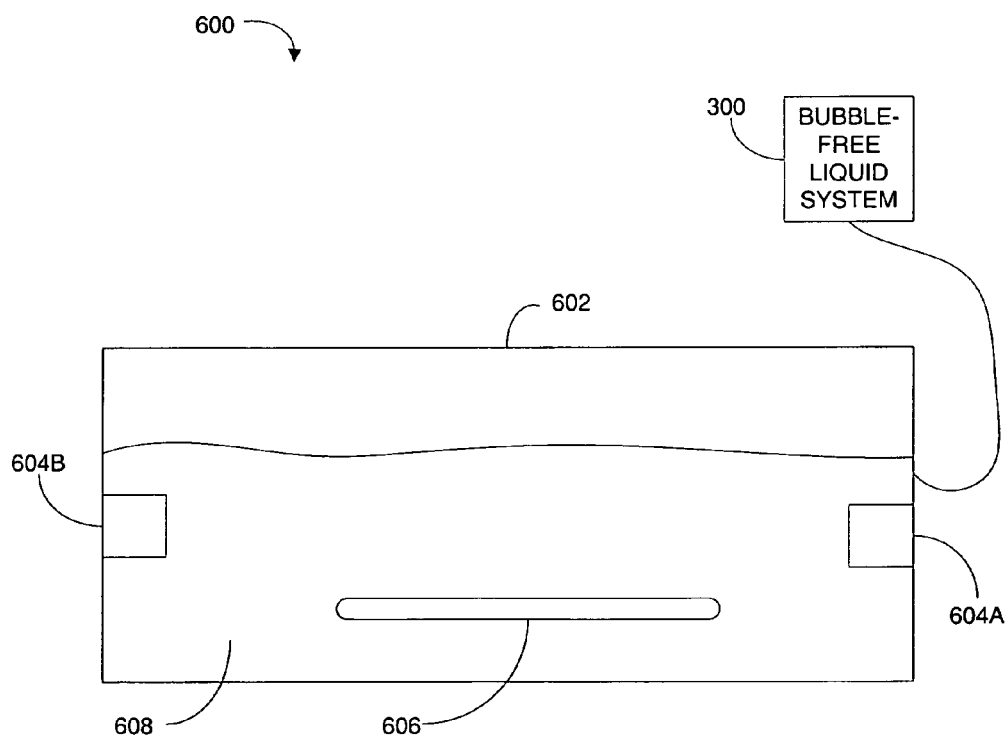
FIG. 6 is a block diagram of an electroplating system using substantially bubble free liquid, in accordance with one embodiment of the present.

FIG. 6 is a block diagram of an electroplating system 600 using substantially bubble free liquid, in accordance with one embodiment of the present. The electroplating system 600 includes the substantially bubble free liquid system 300 as described in FIGS. 3 and 4 above. The electroplating system 600 also includes an electroplating chamber 602 for holding the electrolyte fluid 608 and electrodes 604A and 604B. A target 606 (e.g., a semiconductor substrate or other target) is substantially submersed in the electrolyte fluid 608. Substantially eliminating the bubbles in the electrolyte 608 in the substantially bubble free liquid system 300 increases the effectiveness of the electroplating system 600.

Figure 7:
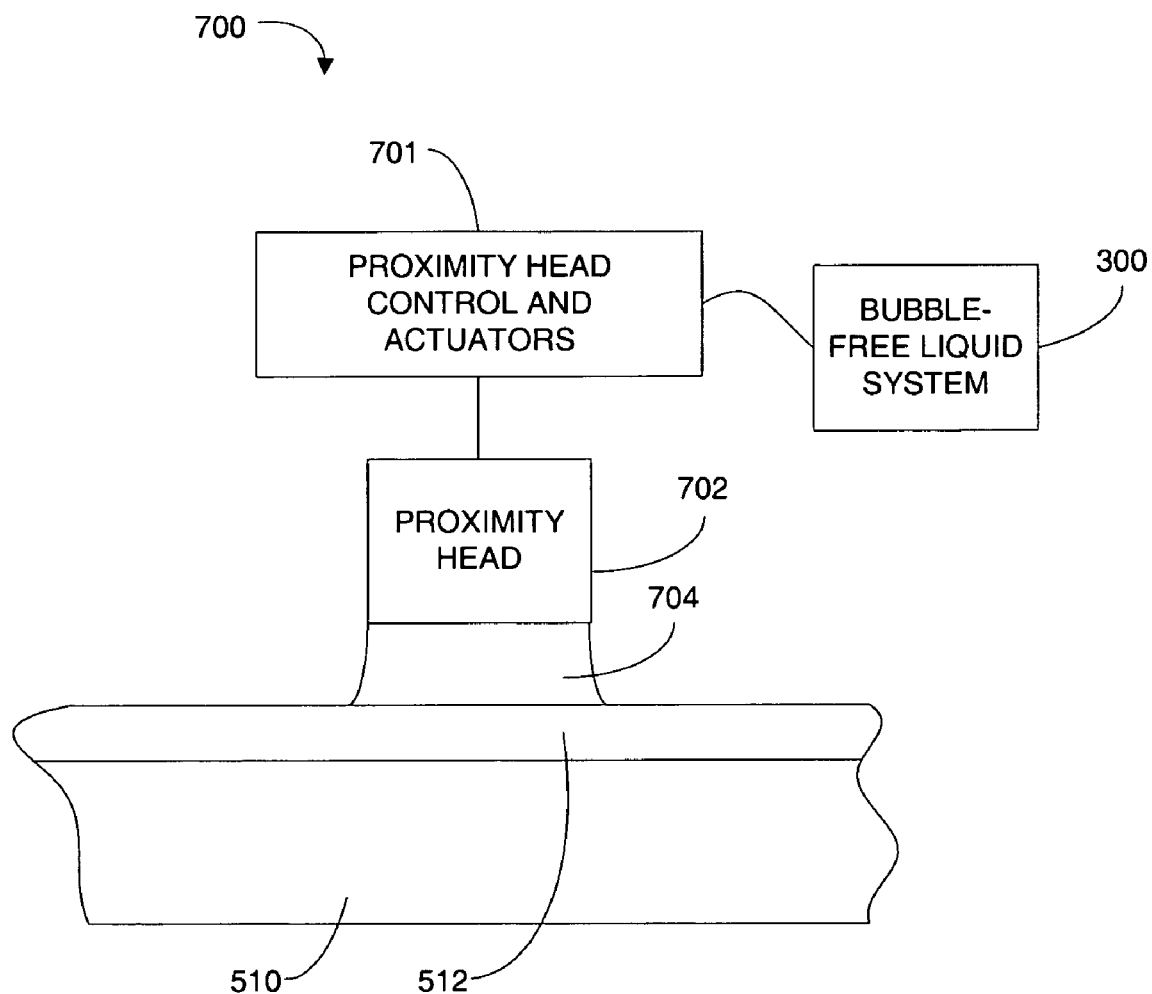
FIG. 7 is a block diagram of a proximity head system using substantially bubble free liquid, in accordance with one embodiment of the present invention.

FIG. 7 is a block diagram of a proximity head system 700 using substantially bubble free liquid, in accordance with one embodiment of the present invention. The system 700 includes the substantially bubble free liquid system 300 as described in FIGS. 3 and 4 above. The system 700 also includes the proximity head controls and actuators 701. The substantially bubble free liquid system 300 provides substantially bubble free liquid to the proximity head controls and actuators 701. The proximity head controls and actuators 701 deliver the substantially bubble free liquid to the proximity head 702. The proximity head 702 uses the substantially bubble free liquid to form a liquid meniscus 704. The substantially bubble free liquid in the meniscus can improve the process (e.g., cleaning, rinsing, drying, etching, etc.) being applied to the layer 512 that is being processed.

A liquid meniscus can be manipulated with a proximity head such as described in co-pending and commonly owned U.S. patent application Ser. No. 10/769,498, filed on Jan. 30, 2004, which issued as U.S. Pat. 7,078,344 and entitled "Stress Free Etch Processing in Combination with a Dynamic Liquid Meniscus," which is incorporated herein by reference in its entirety. A dynamic liquid meniscus process allows very small portions of the surface area of the substrate to be processed. Thereby allowing very precise control of the forces applied therein.

Figure 8A:
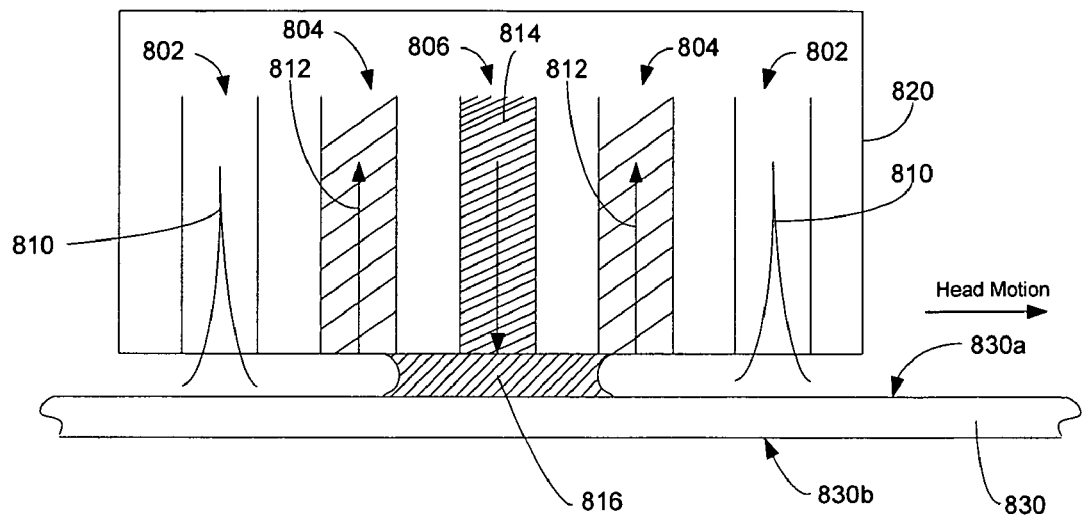
FIG. 8A illustrates a proximity head performing an exemplary substrate processing operation in accordance with one embodiment of the present invention.

FIG. 8A illustrates a proximity head 820 performing an exemplary substrate processing operation in accordance with one embodiment of the present invention. The proximity head 820, in one embodiment, moves while in close proximity to the top surface 830a of the substrate 830 to conduct a cleaning, polishing or other processing operation. It should be appreciated that the proximity head 830 may also be utilized to process (e.g., clean, polish, etc.) the bottom surface 830b of the substrate 830. In one embodiment, the substrate 830 is rotating so the proximity head 820 may be moved in a linear fashion along the head motion while fluid is removed from the top surface 830a. By applying the EPA 810 through the source inlet 802, the vacuum 812 through source outlet 804, and the deionized water 814 through the source inlet 806, the meniscus 816 can be generated.

Figure 8B:
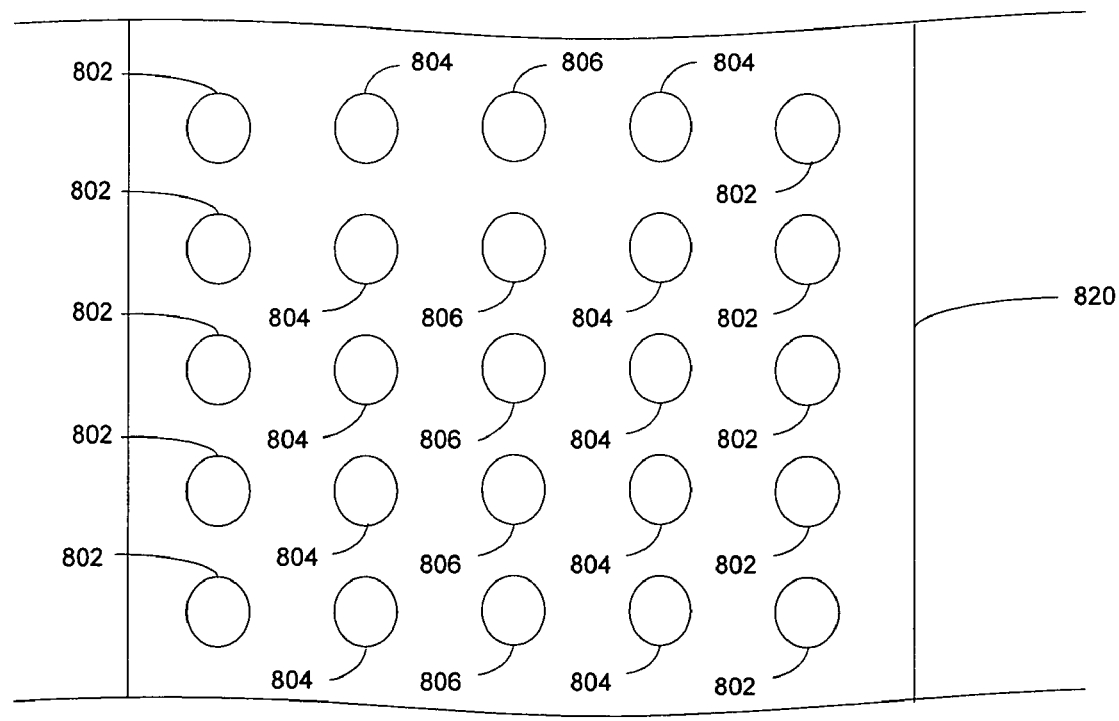
FIG. 8B shows a top view of a portion of a proximity head in accordance with one embodiment of the present invention.

FIG. 8B shows a top view of a portion of a proximity head 820 in accordance with one embodiment of the present invention. In the top view of one embodiment, from left to right are a set of the source inlet 802, a set of the source outlet 804, a set of the source inlet 806, a set of the source outlet 804, and a set of the source inlet 802. Therefore, as $N_2$/IPA and DIW are inputted into the region between the proximity head 820 and the wafer 830, the vacuum removes the $N_2$/IPA and the DIW along with any fluid film that may reside on the wafer 830. The source inlets 802, the source inlets 806, and the source outlets 804 described herein may also be any suitable type of geometry such as for example, circular port, square port, etc. In one embodiment, the source inlets 802 and 806 and the source outlets 804 have circular ports.

Figure 9A:
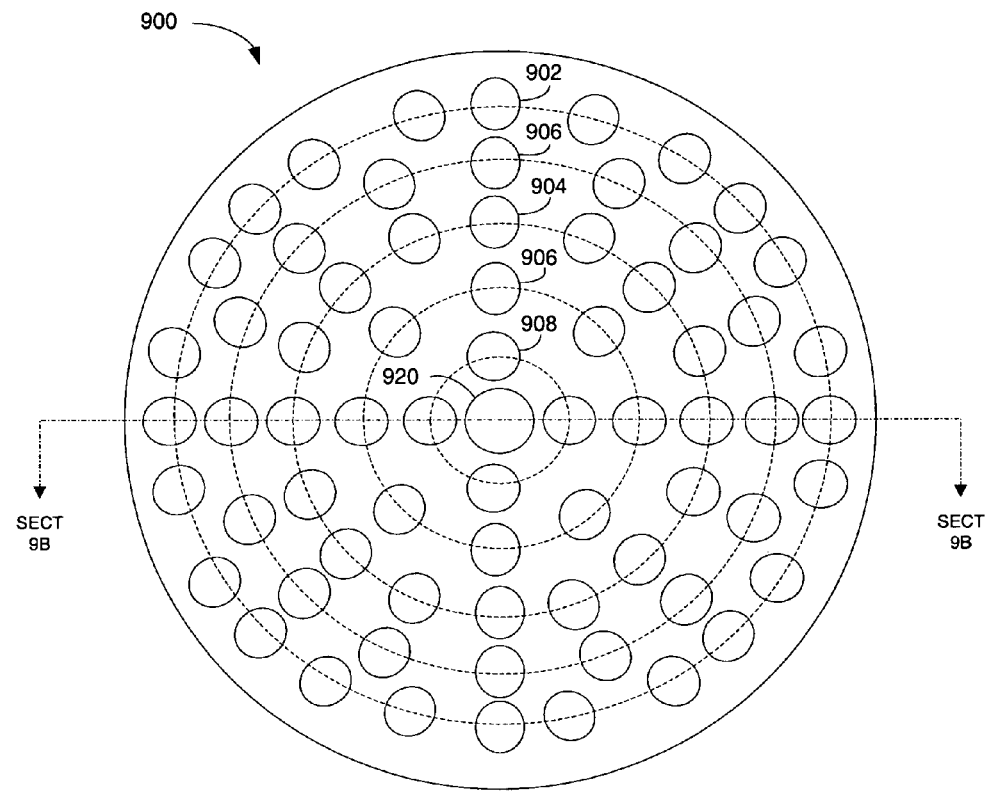
FIG. 9A illustrates an exemplary proximity head, in accordance with one embodiment of the present invention.
Figure 9B:
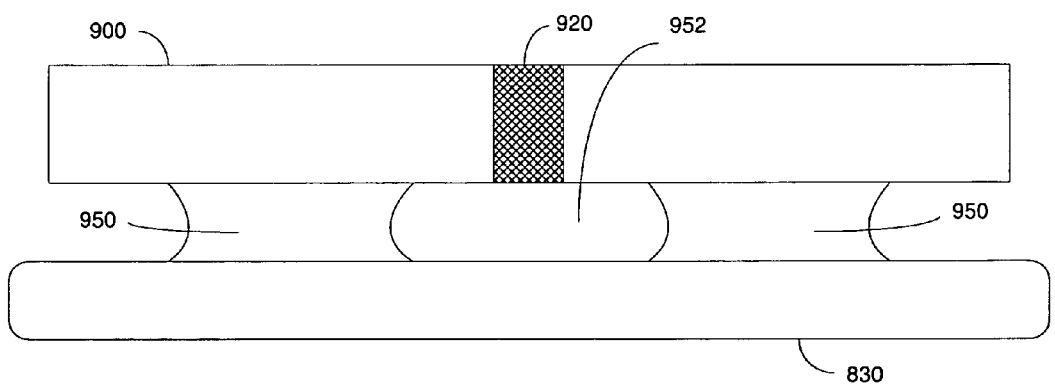
FIG. 9B illustrates a sectional view of the proximity head and the meniscus formed by the proximity head, in accordance with one embodiment of the present invention.

FIG. 9A illustrates an exemplary proximity head 900, in accordance with one embodiment of the present invention. FIG. 9B illustrates a sectional view of the proximity head 900 and the meniscus 950 formed by the proximity head 900, in accordance with one embodiment of the present invention. The proximity head 900 includes a ring of multiple process chemistry inlets 904, two rings of multiple IPA inlets 902 and 908 and a ring of multiple vacuum outlets 906. The various inlets 902, 904, 906 and outlets 908 are arranged around a sensor 920. The sensor 920 is a metrology sensor that can evaluate the progress of the fabrication process being applied by the processing head 900. The sensor can be an optical end-point detection sensor so as to enable the above-described endpoint detection systems and methods to be used.

The meniscus 950 can include a "dry" central region 952 where the liquid meniscus is removed so that the sensor 920 has no intervening processing chemistry from the meniscus 950 between the sensor and the surface of the wafer 830. Rotating the wafer 830 and scanning the proximity head 900, and therefore the sensor 920, across the wafer 830 can provide an in-situ scan of the entire surface of the wafer, as the proximity head processes the wafer. The sensor 920 can also provide real time feedback of the etch process. Providing the real time feedback to a control system that controls the process will provide a closed control loop of the process. The closed loop control of the process can allow the control system to interactively adjust the process in real time. Any of the multiple process variables can be adjusted including head position, concentrations, temperature, resident time, flow rates, pressures, chemistry and other process variables. In this manner more precise process control is provided. A more precise process control allows ever more concentrated chemistries to be used, which in turn reduces the process time of the wafer to a minimum.

The in-situ, real time control of the process can also enable a variable process to be applied to the surface of the wafer such as to correct for a non-uniformity during the processing of the wafer. By way of example, if in a buffing or cleaning process, the sensor can detect a first roughness in a first region of the substrate 830. The process recipe can be dynamically adjusted (e.g., chemistry concentration, residence time, temperature, etc.) for the detected roughness as the proximity head 900 moves across the substrate 830. As a result, a non-uniform surface roughness can be dynamically corrected, in-situ as the cleaning or buffing process is applied to the substrate 830.

In an alternative embodiment, the dry region 952 is not required. By way of example, if the sensor 920 can measure surface roughness through a layer of liquid (e.g., the meniscus 950) such as the process chemistry being applied to the surface of the substrate 830.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

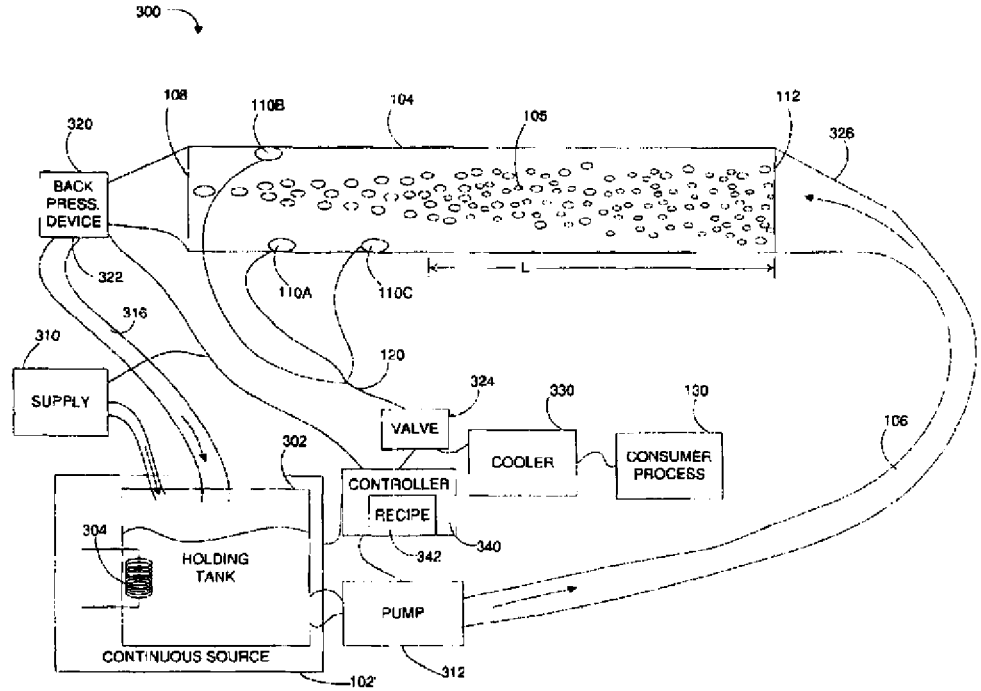

The invention claimed is:

1. A system for producing bubble free liquid comprising:
    a continuous liquid source; and
    a de-bubbling chamber including:
        an inlet coupled to an outlet of the continuous liquid source by a supply pipe;
        an outlet; and
        at least one port in a sidewall of the de-bubbling chamber, the at least
    one port being at least a length L from the inlet of the de-bubbling chamber.

2. The system of claim 1, wherein the continuous liquid source includes a heater for heating the liquid to a temperature less than about boiling point of the liquid.

3. The system of claim 1, wherein the at least one port is coupled to a cooler.

4. The system of claim 1, wherein the continuous liquid source includes a holding tank.

5. The system of claim 4, wherein the continuous liquid source includes a liquid supply coupled to the holding tank.

6. The system of claim 1, wherein the continuous liquid source includes a continuous-type pump.

7. The system of claim 6, wherein the continuous-type pump consists of at least one of a centrifugal or a Levitronix pump.

8. The system of claim 1, wherein the de-bubbling chamber consists of at least one of a PTFE, PVDF, Ertalyte (PET), or stainless steel.

9. The system of claim 1, wherein the length L is equal to at least 10 diameters of the de-bubbling chamber.

10. The system of claim 1, wherein the de-bubbling chamber has a cross-sectional area substantially equal to a cross-sectional area of the supply pipe.

11. The system of claim 1, wherein the de-bubbling chamber has a cross-sectional area greater than a cross-sectional area of the supply pipe.

12. The system of claim 11, wherein the de-bubbling chamber is coupled to the supply pipe by a gradual transition pipe.

13. The system of claim 1, wherein the ports are arranged circumferentially around the de-bubbling chamber.

14. The system of claim 1, wherein the outlet of the de-bubbling chamber includes a back-pressure device.

15. The system of claim 1, wherein the outlet of the de-bubbling chamber is coupled to an inlet of the continuous liquid source.

16. The system of claim 1, wherein the at least one port in a sidewall of the de-bubbling chamber is coupled to at least one of a photolithographic system, a plating system, an electroplating system or a liquid meniscus system.

17. A system for producing bubble free liquid comprising:
    a continuous liquid source including a heater, a holding tank and a continuous-type pump; and
    a de-bubbling chamber including:
        an inlet coupled to an outlet of the continuous liquid source by a supply pipe;
        an outlet including a back-pressure device and wherein the outlet is coupled to an inlet of the continuous liquid source; and
        at least one port in a sidewall of the de-bubbling chamber, the at least one port being at least a length L equal to at least 10 diameters of the de-bubbling chamber from the inlet of the de-bubbling chamber and wherein the at least one port is coupled to a cooler.

18. A method of de-bubbling a liquid comprising:
    providing a continuous flow of liquid through a de-bubbling chamber, the de-bubbling chamber including:
        an inlet coupled to an outlet of the continuous liquid source by a supply pipe;
        an outlet; and
        at least one port in a sidewall of the de-bubbling chamber, the at least one port being at least a length L from the inlet of the de-bubbling chamber; and
    drawing substantially bubble free liquid from the at least one port in the sidewall of the de-bubbling chamber.

19. The method of claim 18, wherein the liquid is heated to a temperature less than about boiling point of the liquid.

20. The method of claim 18, wherein the liquid has a pressure of between about 5 and about 100 psig in the de-bubbling chamber.

21. The method of claim 18, wherein a flow rate through the at least one port is less than about 20% of a total flow into the de-bubbling chamber.

22. The method of claim 18, wherein bubbles greater than about 100 nm have been removed from the liquid flowing through the at least one port.

23. The method of claim 18, wherein the liquid flowing through the at least one port is cooled to a desired temperature.

* * * * *

UNITED STATES PATENT AND TRADEMARK OFFICE
CERTIFICATE OF CORRECTION

| | | |
|---|---|---|
| PATENT NO. | : 7,452,408 B2 | Page 1 of 1 |
| APPLICATION NO. | : 11/173132 | |
| DATED | : November 18, 2008 | |
| INVENTOR(S) | : Jeffrey J. Farber and Carl Woods | |

It is certified that error appears in the above-identified patent and that said Letters Patent is hereby corrected as shown below:

Column 9, Line 45:
After the word "pipe" add --wherein the supply pipe is configured to reduce turbulence in flow of the liquid in the de-bubbling chamber--.

Cancel Claim 10

Column 10, Line 11:
After the word "pipe" add --and is coupled to the supply pipe by a gradual transition pipe--.

Cancel Claim 12

Column 10, Line 30:
After the word "pipe" add --wherein the supply pipe is configured to reduce turbulence in flow of the liquid in the de-bubbling chamber--.

Column 10, Line 43:
After the word "pipe" add --wherein the supply pipe is configured to reduce turbulence in flow of the liquid in the de-bubbling chamber--.

Signed and Sealed this
Twenty-ninth Day of November, 2011

David J. Kappos
*Director of the United States Patent and Trademark Office*

UNITED STATES PATENT AND TRADEMARK OFFICE
CERTIFICATE OF CORRECTION

PATENT NO. : 7,452,408 B2  
APPLICATION NO. : 11/173132  
DATED : November 18, 2008  
INVENTOR(S) : Jeffrey J. Farber and Carl Woods Page 1 of 2

It is certified that error appears in the above-identified patent and that said Letters Patent is hereby corrected as shown below:

Delete the title page and substitute therefore the attached title page showing the corrected number of claims in patent.

Column 9, Line 45:  
After the word "pipe" add --wherein the supply pipe is configured to reduce turbulence in flow of the liquid in the de-bubbling chamber--.

Column 10, lines 6-8:  
Cancel Claim 10

Column 10, Line 11:  
After the word "pipe" add --and is coupled to the supply pipe by a gradual transition pipe--.

Column 10, lines 12-13:  
Cancel Claim 12

Column 10, Line 30:  
After the word "pipe" add --wherein the supply pipe is configured to reduce turbulence in flow of the liquid in the de-bubbling chamber--.

Column 10, Line 43:  
After the word "pipe" add --wherein the supply pipe is configured to reduce turbulence in flow of the liquid in the de-bubbling chamber--.

This certificate supersedes the Certificate of Correction issued November 29, 2011.

Signed and Sealed this  
Tenth Day of January, 2012

David J. Kappos  
*Director of the United States Patent and Trademark Office*

CERTIFICATE OF CORRECTION (continued)

(12) United States Patent
Farber et al.

(10) Patent No.: US 7,452,408 B2
(45) Date of Patent: Nov. 18, 2008

(54) SYSTEM AND METHOD FOR PRODUCING BUBBLE FREE LIQUIDS FOR NANOMETER SCALE SEMICONDUCTOR PROCESSING

(75) Inventors: Jeffrey J. Farber, Delmar, NY (US); Carl Woods, Aptos, CA (US)

(73) Assignee: Lam Research Corporation, Fremont, CA (US)

( * ) Notice: Subject to any disclaimer, the term of this patent is extended or adjusted under 35 U.S.C. 154(b) by 643 days.

(21) Appl. No.: 11/173,132

(22) Filed: Jun. 30, 2005

(65) Prior Publication Data
US 2007/0000387 A1   Jan. 4, 2007

(51) Int. Cl.
*B01D 19/00* (2006.01)
(52) U.S. Cl. .................. 95/260; 95/241; 96/205; 96/155; 96/206
(58) Field of Classification Search .......... 95/260, 95/241; 96/204–218, 155
See application file for complete search history.

(56) References Cited

U.S. PATENT DOCUMENTS

| | | | | |
|---|---|---|---|---|
| 1,734,507 A * | 11/1929 | Westling et al. | ...... | 96/208 |
| 2,816,490 A * | 12/1957 | Boadway et al. | ...... | 96/195 |
| 3,345,803 A * | 10/1967 | Smith | ...... | 95/260 |
| 4,756,724 A * | 7/1988 | Yuill | ...... | 96/158 |
| 5,507,858 A * | 4/1996 | Jepson | ...... | 95/262 |
| 6,752,860 B1 * | 6/2004 | Hoydal et al. | ...... | 96/157 |
| 2003/0221561 A1 * | 12/2003 | Milo | ...... | 96/175 |
| 2006/0137974 A1 * | 6/2006 | Du et al. | ...... | 204/232 |

OTHER PUBLICATIONS

PCT International Search Report PCT US06.23134 (4 pages) Dated Jun. 10, 2008.

* cited by examiner

*Primary Examiner*—Duane Smith
*Assistant Examiner*—Douglas J Theisen
(74) *Attorney, Agent, or Firm*—Martine Penilla & Gencarella, LLP

(57) ABSTRACT

A system for producing bubble free liquid includes a continuous liquid source and a de-bubbling chamber. The de-bubbling chamber includes an outlet and an inlet. The inlet coupled to an outlet of the continuous liquid source by a supply pipe. The de-bubbling chamber also includes at least one port in a sidewall of the de-bubbling chamber. The at least one port being at least a length L from the inlet of the de-bubbling chamber. A method for producing bubble free liquid is also described.

22 Claims, 8 Drawing Sheets